Dec. 22, 1942.    H. HEYMANN ET AL    2,305,783
MEANS FOR DETERMINING THE WEIGHT OF BODIES
Filed April 7, 1939
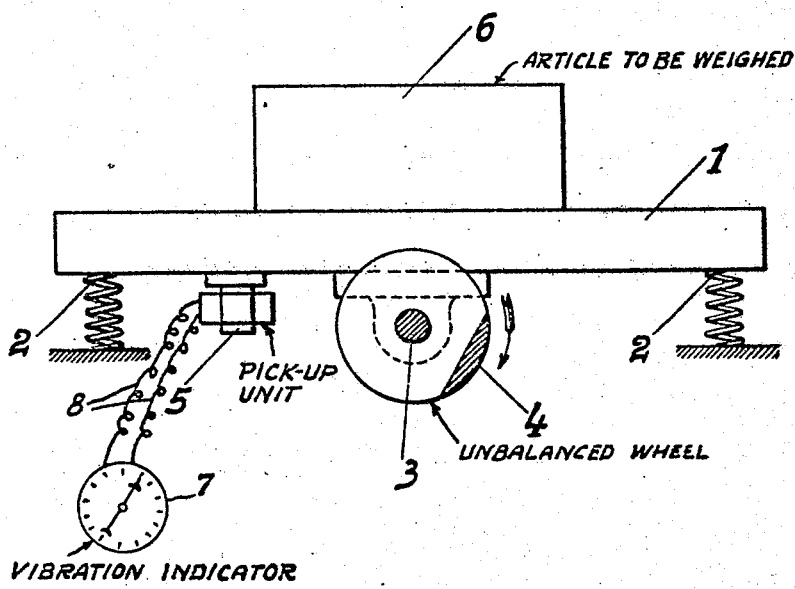
INVENTORS:
Dr.-Ing. Hans Heymann,
Dr.-Ing. Heinz Kurz,
Georg Hossenfelder, and
Ludwig Preismann
by S. Sokal Attorney Patented Dec. 22, 1942

2,305,783

UNITED STATES PATENT OFFICE 2,305,783

MEANS FOR DETERMINING THE WEIGHT OF BODIES

Hans Heymann, Darmstadt, Heinz Kurz, Munich, Georg Hossenfelder, Berlin, and Ludwig Preissmann, Pfungstadt, near Darmstadt, Germany; vested in the Alien Property Custodian Application April 7, 1939, Serial No. 266,498 In Germany February 14, 1938

2 Claims. (Cl. 265—27)

In addition to the generally known weighing devices, such as steel yards, spring balances, tilting balances, measuring cylinders and the like, it has also been proposed, in order to determine the weight of bodies, to employ devices in which the body to be weighed is introduced into an oscillatory system maintained in its initial position, which, after release, carries out an oscillatory movement influenced by the weight of the body. The size of this oscillatory movement is ascertained and serves as a measurement for the weight of the body to be tested.

The advantages of the aforesaid devices, which depend substantially on the elimination of the friction of the fulcrum during the weighing operation, are offset by several disadvantages, the chief of which is the difficulty of determining accurately the extent of oscillation. In the majority of these devices there is the further disadvantage that the extent of oscillation with small loads is disproportionately smaller than with large loads, so that the accuracy is less in the determination of smaller loads.

The object of the invention is to avoid these disadvantages and according to the invention the body to be weighed is introduced as an additional mass into an oscillatory system and the influence of this alteration in the mass on the oscillation is measured. In contrast to the known weighing devices with an oscillatory system in which, after release of the system, a single oscillation is measured, the invention employs a system which is under oscillation and in which the change of oscillation is observed on the introduction of the body to be weighed. It is obvious that in this way the reading of the value obtained, which no longer depends on the observation of the reversing point of a single oscillation, presents no difficulties. Also according to the invention the conditions as regards the extent of oscillation and accordingly the accuracy of measurement are quite different from those in the majority of the known oscillatory balances, that is the extent of oscillation decreases with an increasing load and vice versa. It, therefore, follows that weighing is more accurate in the lower loading range and that, therefore, the loading range of such a balance can be considerably increased.

Reference will now be made to the single figure of the accompanying drawing which illustrates schematically one of the possible forms of construction of a device for carrying out the invention for determining the weight of bodies.

A plate 1 is supported by springs 2 and is set in oscillation by means of a rotating shaft 3 (for example in the direction of the arrow). The shaft 3 is, for this purpose, provided with an unbalanced mass 4. In order to measure the size of the oscillation an electro-dynamic vibration pick-up unit 5 of the known type is arranged, so that the electrical equivalent of the oscillations of the plate 1 can be read off on an electrical vibration indicator 7 connected to the pick-up unit by wires 8. When the body 6 to be weighed (additional mass) is arranged on the plate 1, the magnitude indicated on the vibration indicator varies with the extent of oscillation of the platform and this correspondingly varies with the imposed load 6 so that, by proper calibration of the vibration indicator, the mass of the load 6 may be directly read on the indicator.

We claim:

1. In a weighing machine, a resiliently supported load receiving platform, means permanently secured beneath said platform producing a constant vibration of the platform during the weighing operation, and means attached to the platform and measuring the amplitude of the vibrations in terms of the weights of the loads imposed on said platform.

2. In a weighing machine, a resiliency supported load receiving platform, bearings fixed beneath the center of said platform, a rotating shaft journalled in said bearings, a disk carried by said shaft and having its periphery eccentrically weighted, and an electro-dynamic vibration pick-up unit carried by said platform and a vibration indicator connected to said unit and calibrated to measure the amplitude of the vibrations in terms of the weights of the loads imposed on the platform.

HANS HEYMANN.
LUDWIG PREISSMANN.
GEORG HOSSENFELDER.
H. KURZ.